US012638929B2

(12) United States Patent
Wang et al.

(10) Patent No.:  US 12,638,929 B2
(45) Date of Patent:  May 26, 2026

(54) SYSTEMS AND METHODS FOR PROVIDING INTERACTIONS BETWEEN VIRTUAL AND PHYSICAL PARTICIPANTS

(71) Applicant: JPMORGAN CHASE BANK, N.A., New York, NY (US)

(72) Inventors: Cheng Yao Wang, Flushing, NY (US); Ana Cardenas, Goleta, CA (US); Fannie Liu, Brooklyn, NY (US); William Moriarty, West Chester, PA (US); David Saffo, New York, NY (US); Feiyu Lu, New York, NY (US); Joseph W Ligman, Weston, CT (US); Goutam Maity, New York, NY (US); Hamed Drame, New York, NY (US); Blair MacIntyre, Westwood, MA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/882,477

(22) Filed: Sep. 11, 2024

(65) Prior Publication Data

US 2026/0072528 A1    Mar. 12, 2026

(51) Int. Cl.
*G06F 3/0346* (2013.01)
*G06F 3/01* (2006.01)
*G06T 19/00* (2011.01)

(52) U.S. Cl.
CPC ............ *G06F 3/0346* (2013.01); *G06F 3/017* (2013.01); *G06T 19/006* (2013.01)

(58) Field of Classification Search
CPC ...... G06F 3/0346; G06F 3/017; G06T 19/006
See application file for complete search history.

(56) References Cited

U.S. PATENT DOCUMENTS

2022/0101593 A1* 3/2022 Rockel .................. A63F 13/655
2024/0119682 A1* 4/2024 Rudman .............. G06T 19/006

* cited by examiner

*Primary Examiner* — Adam R. Giesy
(74) *Attorney, Agent, or Firm* — GREENBERG TRAURIG LLP

(57) ABSTRACT

Systems and methods for providing interactions between virtual and physical participants are disclosed. A synchronizing computer program receives a physical location and orientation of a physical portal device in a physical environment. The physical portal device includes a monitor and a computer processor executing an augmented reality application. The synchronizing computer program aligns the physical location and orientation with a virtual location and orientation of a virtual portal rendered in a virtual environment. A remote user computer program executed by a remote user electronic device receives the virtual location and orientation from the synchronizing computer program and renders the virtual portal in the virtual environment. The augmented reality application streams augmented reality video of the physical environment from the physical portal device to the remote user computer program, which displays the augmented reality video in the virtual portal. The system enables dynamic interactions and synchronization between environments.

18 Claims, 3 Drawing Sheets

SYSTEMS AND METHODS FOR PROVIDING INTERACTIONS BETWEEN VIRTUAL AND PHYSICAL PARTICIPANTS

BACKGROUND OF THE INVENTION

1. Field of the Invention

Embodiments are generally directed to systems and methods for providing interactions between virtual and physical participants.

2. Description of the Related Art

Hybrid conferences, such as meetings with remote (or virtual) and in-person, or physical) attendees, have become increasingly prevalent, offering in-person and remote attendance options to enhance inclusivity and sustainability. Despite having benefits, hybrid conferences also present unique challenges, particularly in delivering a cohesive experience for all attendees. Even with advancements in remote participation technologies, such as video conferencing tools and immersive virtual environments, in-person attendance often remains the preferred choice for many, especially at large conferences where interaction and networking are crucial. This preference often results in a dichotomy, with remote and in-person attendees participating in parallel but isolated activities. This division is most noticeable in opportunities for socialization and networking, which is one of the key goals of many conferences.

While in-person participants can easily engage in spontaneous conversations, attend organized social events, and partake in informal discussions following presentations, remote participants are often limited to passive viewing via video conferencing or livestreams, with minimal opportunities to interact dynamically within the conference environment. Consequently, the lack of integrated and meaningful hybrid interactions poses a significant challenge to creating an inclusive and engaging conference experience for all attendees.

SUMMARY OF THE INVENTION

Systems and methods for providing interactions between virtual and physical participants are disclosed. In one embodiment, a method may include: receiving, by a synchronizing computer program executed by a server, a physical location and a physical orientation of a physical portal device in a physical environment, the physical portal device comprising a monitor and a computer processor executing an augmented reality application; aligning, by the synchronizing computer program, the physical location and the physical orientation of the physical portal device with a virtual location and a virtual orientation of a virtual portal rendered in a virtual environment, wherein the virtual portal may be a virtual representation of the physical portal device; receiving, by a remote user computer program executed by a remote user electronic device, the virtual location and virtual orientation of the virtual portal from the synchronizing computer program; rendering, by the remote user computer program, the virtual portal in the virtual environment according to the virtual location and virtual orientation; streaming, by the augmented reality application, augmented reality video of the physical environment from the physical portal device to the remote user computer program; and displaying, by the remote user computer program, the augmented reality video in the virtual portal.

In one embodiment, the method may also include: capturing, by the remote user computer program, audio and video of a remote user; streaming, by the remote user computer program, the audio and video to the augmented reality application; and displaying, by the augmented reality application, a virtual representation of the remote user in the virtual environment on the monitor of the physical portal device.

In one embodiment, the method may also include: receiving, by the synchronizing computer program, an updated physical location and an updated physical orientation of the physical portal device; and updating, by the synchronizing computer program, the physical location and the physical orientation of the virtual portal in the virtual environment based on the updated physical location and the updated physical orientation.

In one embodiment, the method may also include: receiving, by the synchronizing computer program, a remote user location and a remote user orientation of the remote user; and synchronizing, by the synchronizing computer program, the remote user location and the remote user orientation of the remote user with the virtual representation of the remote user in the physical environment.

In one embodiment, the method may also include: capturing, by the augmented reality application, a gesture from a user of the physical portal device and initiating an action based on the gesture. In one embodiment, the action may include animating passing an object from the physical environment to the virtual environment, animating the user of the physical portal device in the virtual environment, etc.

In one embodiment, the method may also include: capturing, by the augmented reality application, a scan of the physical environment; and generating, by the augmented reality application, an augmented reality map comprising a coordinate system. The synchronizing computer program synchronizes the physical location and the physical orientation of the physical portal device to the virtual location and the virtual orientation of the virtual portal using the coordinate system.

In one embodiment, the virtual environment may be a representation of the physical environment.

In one embodiment, the augmented reality video may include video of the physical environment and a virtual object generated by the augmented reality application.

According to another embodiment, a system may include: a physical portal device located in a physical environment, the physical portal device comprising: a monitor configured to display a virtual environment; a camera configured to capture video of the physical environment, and an augmented reality application executed by a computer processor; a remote user electronic device executing a remote user computer program; and a server comprising a computer processor and executing a synchronizing computer program. The synchronizing computer program may be configured to receive a physical location and a physical orientation of the physical portal device; the synchronizing computer program may be configured to align the physical location and the physical orientation of the physical portal device with a virtual location and a virtual orientation of a virtual portal rendered in a virtual environment, wherein the virtual portal may be a virtual representation of the physical portal device; the remote user computer program may be configured to receive the virtual location and virtual orientation of the virtual portal from the synchronizing computer program; the remote user computer program may be configured to render the virtual portal in the virtual environment according to the virtual location and virtual orientation; the augmented reality application may be configured to stream augmented reality video of the physical environment from the physical portal device to the remote user computer program; and the remote user computer program may be configured to display the augmented reality video in the virtual portal.

In one embodiment, the remote user computer program may be configured to capture audio and video of a remote user; the remote user computer program may be configured to stream the audio and video to the augmented reality application; and the augmented reality application may be configured to display a virtual representation of the remote user in the virtual environment on the monitor of the physical portal device.

In one embodiment, the synchronizing computer program may be configured to receive an updated physical location and an updated physical orientation of the physical portal device; and the synchronizing computer program may be configured to update the physical location and the physical orientation of the virtual portal in the virtual environment based on the updated physical location and the updated physical orientation.

In one embodiment, the synchronizing computer program may be configured to receive a remote user location and a remote user orientation of the remote user; and the synchronizing computer program may be configured to synchronize the remote user location and the remote user orientation of the remote user with the virtual representation of the remote user in the physical environment.

In one embodiment, the augmented reality application may be configured to capture a gesture from a user of the physical portal device and to initiate an action based on the gesture.

In one embodiment, the action may include animating passing an object from the physical environment to the virtual environment, animating the user of the physical portal device in the virtual environment, etc.

In one embodiment, the augmented reality application may be configured to capture a scan of the physical environment; the augmented reality application may be configured to generate an augmented reality map comprising a coordinate system; and the synchronizing computer program may be configured to synchronize the physical location and the physical orientation of the physical portal device to the virtual location and the virtual orientation of the virtual portal using the coordinate system.

In one embodiment, the virtual environment may be a representation of the physical environment.

In one embodiment, the augmented reality video may include video of the physical environment and a virtual object generated by the augmented reality application.

BRIEF DESCRIPTION OF THE DRAWINGS

For a more complete understanding of the present invention, the objects and advantages thereof, reference is now made to the following descriptions taken in connection with the accompanying drawings in which.

4

DETAILED DESCRIPTION OF PREFERRED EMBODIMENTS

Figure 1:
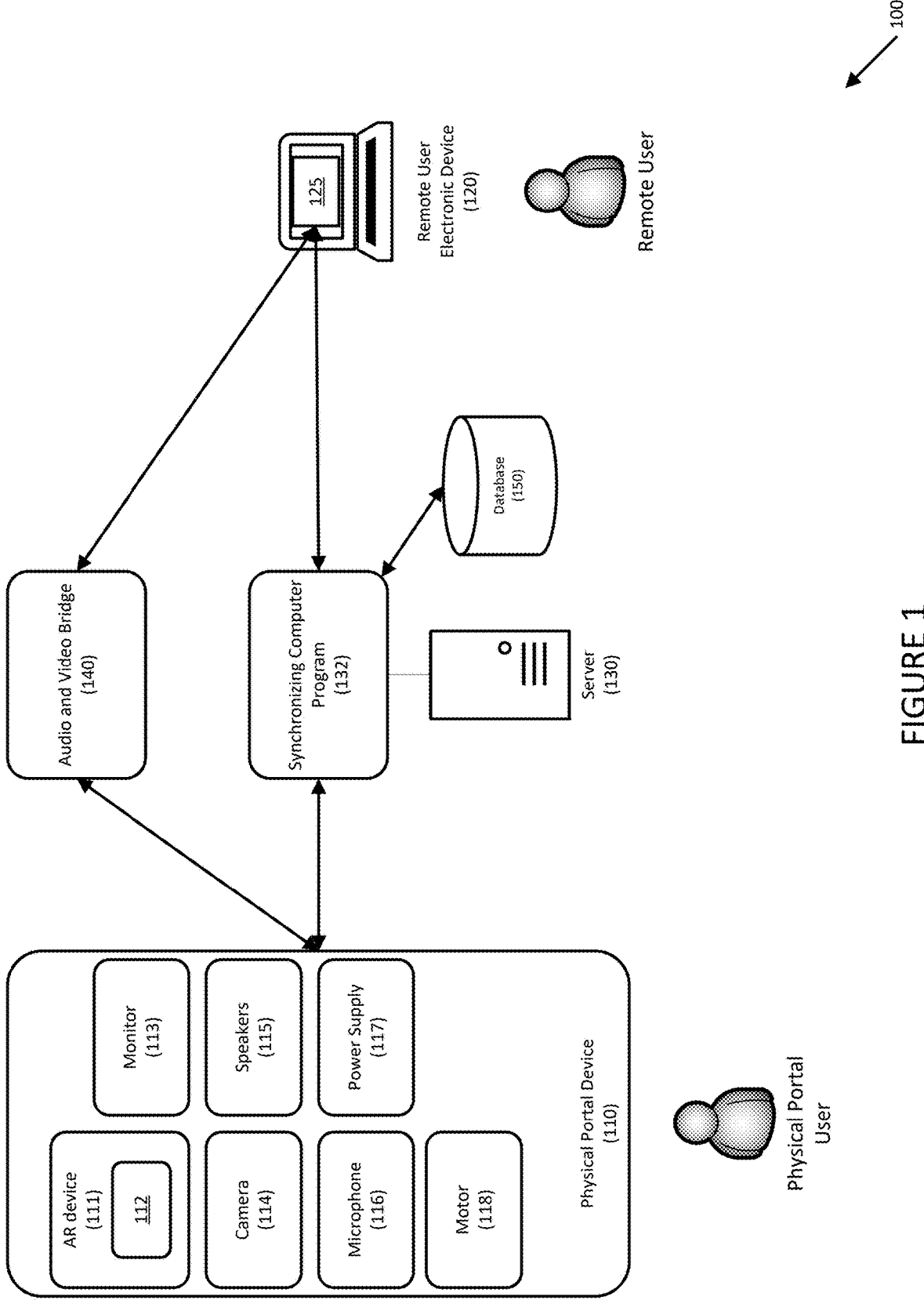
FIG. 1 illustrates a system for providing interactions between virtual and physical participants according to an embodiment.

Systems and methods for providing interactions between virtual and physical participants are disclosed.

Embodiments may provide a system that seamlessly connects the virtual and physical environments while enabling interactions between virtual and physical participants. Embodiments may include a physical portal device, such as a large movable monitor, in the physical environment that displays the virtual environment with remote attendees' images or avatars while streaming the real-time augmented reality video and audio to the remote participants, and an immersive multiuser virtual environment for the remote attendees having a virtual portal into the physical environment wherever the portal is located. Embodiments may provide spatial alignment between the two environments, such that moving the physical portal or the virtual portal will show more of the virtual environment to in-person attendees, and more of the physical environment to remote attendees.

Embodiments may provide synchronization between the virtual and physical environments using a synchronization computer program. In one embodiment, the location of the physical portal device in the physical environment may be synchronized with a location of a virtual portal device in the virtual environment, such that movement of the physical portal device in the physical environment is reflected as movement by the virtual portal in the virtual environment.

Through multi-user pose estimation, in-person attendees may intuitively interact with the portal and the remote attendees with body gestures.

Embodiments may enable hybrid social interactions, such as influencing the other environment, "teleporting" to other environment, and moving "objects" between environments.

To represent remote attendees, embodiments may use avatars. The avatars may offer extensive customization options. The avatars may be provided with animations, such as wave, dance, and cheer, thereby allowing remote attendees to convey emotions and actions. The avatars may be controlled to reflect a gesture provided by the remote user that is captured by the remote user's computer.

Embodiments may track full-body movements, such as hands, legs, and facial expressions.

In embodiments, the virtual environment may replicate aspects of the physical space, such that the virtual layout aligns with the physical layout. This alignment allows in-person attendees to navigate the virtual environment through the physical portal without encountering visual obstructions or mismatches with virtual objects. The visual style of the virtual environment may be adapted to various scenarios, ranging from a cozy fantasy setting to a digital twin of the physical venue.

Embodiments may provide server-side synchronization to synchronize the virtual environment with the physical environment in real time. This provides all participants with a cohesive experience, with avatars and virtual objects moving consistently across the environments.

Embodiments may use a web-based 3D engine to deliver an interactive three-dimensional experience, including virtual environments, avatars, and objects. Remote attendees may navigate the virtual environment using a first-person perspective, similar to extended reality platforms, using keyboard and mouse controls.

In embodiments, remote participants may participate using extended reality (e.g., virtual reality or augmented reality) headsets.

Embodiments may use a proximity-based approach for audio communications that limits hearing and speaking to users within a certain range (e.g., 2.5-meter range) in order to reduce confusion from distant conversations.

By receiving the physical location and orientation of the physical portal device in the physical environment and aligning it with the virtual location and orientation of a virtual portal in a virtual environment, embodiments ensure that both environments are synchronized. This spatial alignment allows for a seamless interaction between virtual and physical participants, thereby enhancing the immersive experience for both users of the physical portal and remote users.

The use of a synchronizing computer program to align the physical and virtual portals ensures that any movement or orientation changes in the physical portal are accurately reflected in the virtual environment. This real-time synchronization minimizes latency and discrepancies, providing a cohesive and consistent experience for users.

Streaming augmented reality video from the physical portal device to the remote user computer program and displaying it in the virtual portal allows remote users to have a real-time view of the physical environment. This capability bridges the gap between virtual and physical spaces, enabling remote users to feel more connected and engaged with the users of the physical portal.

The integration of augmented reality applications and remote user computer programs facilitates dynamic interactions, such as gestures and movements, to be captured and rendered accurately in both environments. This enhances the interactivity and realism of the hybrid conference experience, making it more engaging and inclusive for all participants.

Referring to FIG. 1, a system for providing interactions between remote and physical participants is disclosed according to an embodiment. System 100 may include physical portal device 110, which may include augmented reality device 111, monitor or other display 113 camera 114, microphone 116, speakers 115, power supply 117, and motor 118.

In one embodiment, camera 114 may articulate independently of physical portal device 110.

Monitor 113 may receive video from audio and video bridge 140, such as images of a virtual environment, avatars for remote attendees, etc. It may further receive audio and webcam video from remote user electronic device 120.

Augmented reality device 111 may be a computer executing augmented reality application 112 that may receive video from camera 114 and audio from microphone 116, and may stream the audio and augmented reality video, such as the video plus any augmentations thereto (e.g., virtual elements), to audio and video bridge 140. It may also communicate information for physical portal device 110, such as location data, orientation data, etc.

In one embodiment, camera 114, microphone 116, and/or speakers 115 may be integrated into augmented reality device 111.

Power supply 117 may provide power to monitor 114, augmented reality device 111, camera 114, speaker 115, microphone 116, and/or motor 118.

In one embodiment, some of the elements of physical portal device 110 may be provided as a computer, a smart phone, a tablet, etc. For example, the device's camera, speaker, microphone, and the display may be used. In one embodiment, the device may also execute augmented reality application 112.

A carrier, such as a cart, may be provided for receiving such a device. Alternatively, the device may be handheld.

One or more physical portal users may interact with physical portal device 110. For example, camera 114 may capture images and/or video of the physical portal users, as well as gestures and other inputs received from the physical portal users. Microphone 116 may capture audio and other commands from physical portal users. Augmented reality application 112 may identify the gestures and/or verbal commands, and may initiate an action, such as an interaction with one or more remote users.

Remote user electronic device 120 may be provided for one or more remote users. Remote user electronic device 120 may be any suitable electronic device, such as a computer (e.g., workstation, desktop, laptop, notebook, tablet, etc.), a smart device (e.g., smart phone, smart watch, etc.), an extended reality device (e.g., virtual reality headset, augmented reality headset, etc.), that includes a web camera, display and a speaker.

Remote user electronic device 120 may execute remote user computer program 125 that may receive video from the web camera and audio from the microphone and may communicate the audio and video to audio and video bridge 140.

In one embodiment, remote user computer program 125 may capture remote user pose data (e.g., gestures captured by the web camera, facial expressions captured by the web camera, manually entered gestures and expressions, etc.) and may communicate the remote user pose data for the remote user's avatar to synchronizing computer program 132.

Augmented reality application 112 may capture a scan of the physical environment in which physical portal device 110 is located. It may generate, from the scan, a virtual environment from the scan. Avatars for remote users may be included in the virtual environment and displayed on monitor 113. The location and orientation of the avatars for the remote users in the virtual environment may be provided by synchronizing computer program 132. For example, as a remote user "moves" using a keyboard, mouse, or XR headset, or changes its orientation, remote user computer program 125 may communicate the location to synchronizing computer program 132, which may provide the location and/or orientation to augmented reality device, which may then update the location and/or orientation of the remote user's avatar on monitor 113.

Remote user computer program 125 may receive the audio and augmented reality video from physical portal device 110 via audio and video bridge 140 and may present that to the remote user using a display and speaker/headset. Remote user computer program 125 may display the augmented reality video from physical portal device 110 in a virtual portal in a virtual representation of the physical environment in which physical portal device 110 operates. The location for the display of any virtual objects in the augmented reality video may be coordinated via synchronizing computer program 132.

Remote user computer program 125 may further receive pose data for physical portal device 110 from synchronizing computer program 132, and may update the location and/or orientation of the virtual portal in the virtual environment. It may further receive pose data from the physical portal users.

In one embodiment, the remote user may control the physical movement and/or orientation of physical portal device 110 using keyboard and/or mouse entry, by gestures (e.g., by walking), etc. Augmented reality application 112 may receive instructions from remote user computer program 125 to manipulate (e.g., move, rotate, etc.) physical portal device 110, camera 114, etc. This may activate motor 118 on physical portal device 110 to move in the direction entered. In one embodiment, the remote user may manipulate camera 114 on physical portal device 110 to move in different directions by keyboard and/or mouse entry, by head movements (e.g., moving the remote user's head may cause camera to move in a similar direction, etc.), etc.

Although FIG. 1 only depicts one physical portal device 110 and one remote user electronic device 120, it should be recognized that multiple physical portal devices 110 and multiple remote user electronic devices 120 may be provided as is necessary and/or desired.

Server 130 may be any suitable server (e.g., physical and/or cloud based) that may receive data from physical portal device 110 and remote user electronic device 120. Server 130 may execute synchronizing computer program 132, which may synchronize the state of physical portal device 110 and remote users, and may send the states to augmented reality application 112 and remote user computer program 125.

For example, server 130 may receive pose data for physical portal device 110, and pose data for the remote user's avatar from remote user computer program 125, and may process the pose data for the remote user's avatar and output it to physical portal device 110. It may also receive pose data from physical portal device 110 and may output it to remote user computer program 125.

To ensure accurate alignment between the virtual and physical environments, server 130 may receive a scan and/or augmented reality map of the physical environment (i.e., the area in which physical portal device 110 is located) to which establishes a tracking coordinate system. Once the physical location of physical portal device 110 is aligned with its location in the virtual representation of the physical environment, synchronizing computer program 132 may receive the pose data for physical portal device 110 and remote user avatars in real time, may update the state of physical portal device 110 and the remote user avatars, and may propagate the updates to physical portal device 110 and remote user electronic device 120.

Synchronizing computer program 132 may also maintain a location for each remote user and may synchronize the location of the avatar, image, or streaming video of the remote user for display by augmented reality application 112.

Audio and video bridge 140 may communicate audio and augmented reality video from augmented reality device 111 to remote user computer program 125, and may communicate audio and video from remote user computer program 125 to augmented reality device 111.

Database 150 may store data that may be used to authenticate the remote user and/or users participating using physical portal device 110. For example, physical portal users and/or remote users may be authenticated by providing credentials, biometrics, etc. to physical portal device and remote user electronic device, respectively.

Figure 2:
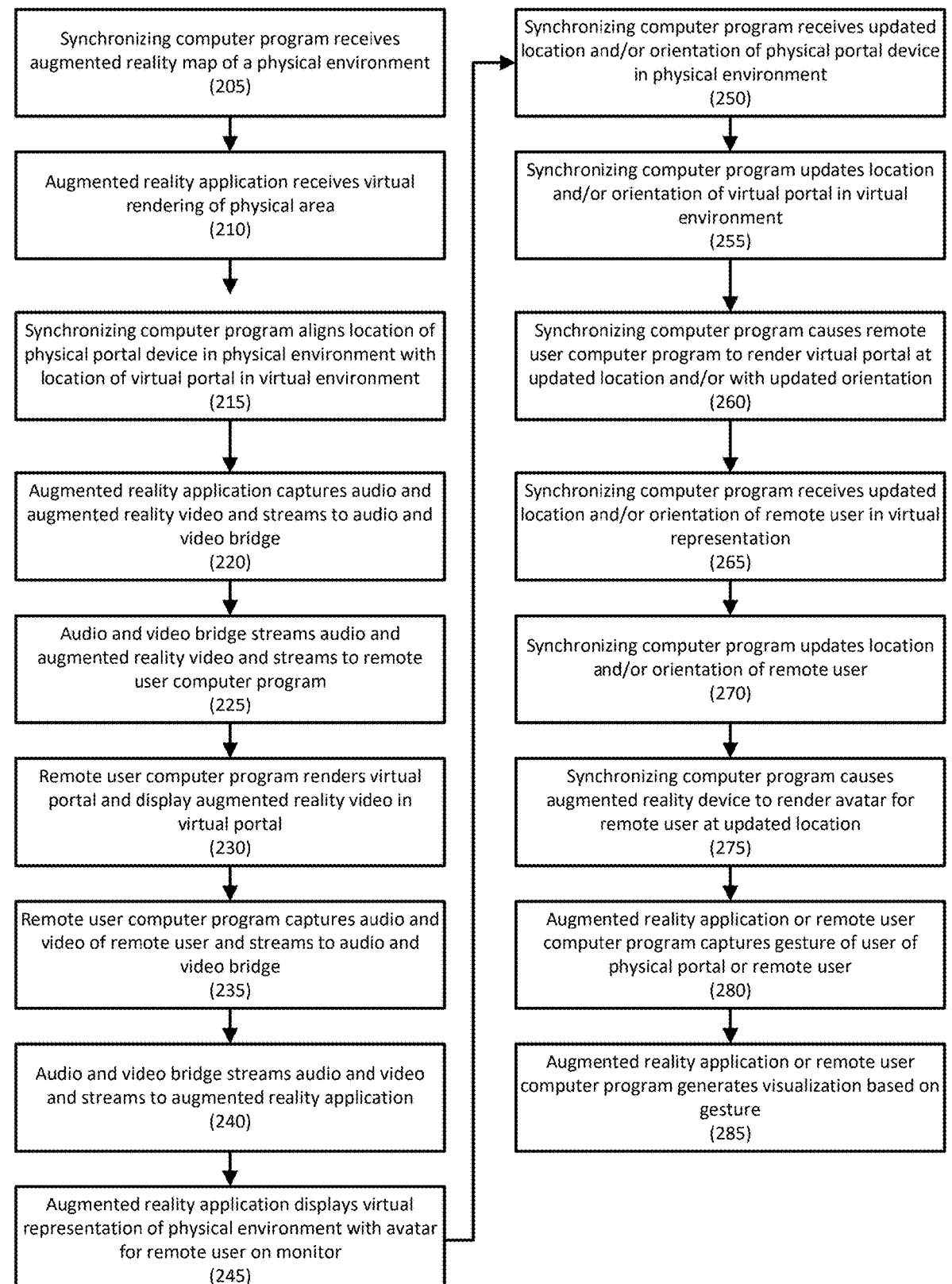
FIG. 2 illustrates a method for providing interactions between virtual and physical participants according to an embodiment.

Referring to FIG. 2, a method for rendering a virtual portal in a virtual environment is provided according to an embodiment.

In step 205, a synchronizing computer program executed by a server may receive an augmented reality map of a physical environment. In one embodiment, the augmented reality map may be generated from a scan of the physical environment, may include dimensions of the physical environment, objects in the physical environment, etc. The augmented reality map may include a coordinate system for tracking the movement of a physical portal device in the physical environment.

In step 210, an augmented reality application executed by an augmented reality application may receive a virtual rendering of the physical environment. In one embodiment, the virtual rendering may be based on the augmented reality map, and may include virtual representations of objects within the physical environment, such as walls, furniture, windows and doors, the floor, the ceiling, etc.

In step 215, the synchronizing computer program may align a location of a physical portal device in a physical environment with a location of a virtual portal in a virtual environment. For example, the augmented reality application may capture the location and/or orientation of the physical portal device and may communicate that information to the synchronizing computer program, which may receive the coordinates of the physical portal device in the physical environment, as well as an orientation of the physical portal device. The synchronizing computer program may update the coordinates for the physical portal device and may send the update to the remote user electronic device(s), which may update the location of the physical portal device.

In step 220, the augmented reality application may capture audio and augmented reality video (e.g., video of a physical area and any augmentations thereof, such as virtual objects) and may communicate or stream the audio and augmented reality video to an audio and video bridge, such as a service that facilitates audio and video communication among a plurality of electronic devices.

In step 225, the audio and video bridge may communicate or stream the audio and augmented reality video from the augmented reality device to a remote user computer program executed by a remote user electronic device.

In one embodiment, the audio and video bridge may not be used; instead, the audio and augmented video may be streamed from the augmented reality device to the remote user computer program over any suitable network.

In step 230, the remote user computer program may render a virtual portal in the virtual representation of the physical area that corresponds to the physical portal device and may display the augmented reality video in the virtual portal. The virtual portal may be a virtual representation of the physical portal (e.g., a virtual representation of the monitor of the physical portal device. The augmented reality video may be displayed or presented in the virtual portal so that it corresponds to what the camera on the physical portal device is capturing, while simultaneously displaying the virtual representation of the physical area.

In step 235, the remote user computer program may capture audio and video of the remote user, and may stream the audio and video to the audio and video bridge.

In one embodiment, the remote user may select an avatar to display on the monitor of the physical portal device, or it may stream audio and video captured by the remote user electronic device. Any gestures captured by the remote user computer program may be reflected as gestures by the avatar.

In step 240, the audio and video bridge may stream the audio and video from the remote user computer program to the augmented reality device.

In one embodiment, the audio and video bridge may not be used; instead, the audio and video may be streamed from the remote user computer program to the augmented reality device over any suitable network.

In step 245, the augmented reality application may display the virtual representation of the physical environment on the monitor. For example, the augmented reality application may receive the avatar for the remote user and may display the avatar at a location that is selected by the remote user.

In one embodiment, the monitor may provide a virtual representation of the remote user's environment.

In step 250, the synchronizing computer program may receive an updated location and/or orientation of the physical portal device in the physical environment. For example, the augmented reality device may indicate movement in the physical environment to the synchronizing computer program. The movement may be sensed, for example, by the augmented reality application. For example, the synchronizing computer program may receive updated coordinates and/or an updated orientation of the physical portal device in the physical environment.

In step 255, the synchronizing computer program may update the location and/or orientation of the virtual portal in the virtual environment based on the updated location and/or orientation of the physical portal device.

In step 260, the synchronizing computer program may cause the remote user computer program to render the virtual portal at the updated location and/or with the updated orientation for the physical portal device. For example, the synchronizing computer program may send the coordinates and/or orientation of the physical portal device to the remote computer program and the remote user computer program may render the virtual portal at the updated location and with the updated orientation.

In step 265, the synchronizing computer program may receive an updated location and/or orientation of the remote user.

In step 270, the synchronizing computer program may update the location and/or orientation of the remote user, and may send the location and/or orientation to the augmented reality application.

In step 275, the augmented reality application may update the location of the remote user, and may update the location and orientation of the avatars and/or streaming video for the remote users in the virtual representation of the physical environment that is displayed on the monitor.

In step 280, at any time, the augmented reality application may capture or receive a gesture from a user of the physical portal. For example, the user of the physical portal may make a facial expression, move his or her arms, may position his or her body in a certain position, may utter a command, or may interact with the physical portal using an input device or accessory (e.g., hand-worn sensors, a user interface device, etc.). In one embodiment, the command may be to "pass" an object from the physical portal side to the remote user side, or vice-versa. In another embodiment, the remote user may "teleport" to the physical environment, or the user of the physical portal may "teleport" to the virtual environment.

In step 285, the augmented reality computer program may take an appropriate action based on the gesture. For example, upon identifying the gesture or command to "pass" an object from the physical environment to the virtual environment, or to "teleport" a user of the physical portal to the virtual environment, the remote user computer program may generate a visualization of the object or user in the virtual environment, and may animate the object or user at a location in the virtual environment. As the object or user moves, the location of the object or user may be synchronized by the synchronizing computer program.

In one embodiment, for the user of the physical portal to "teleport" to the virtual environment, video (e.g., red-green-blue video) and depth data of the user of the physical portal or object, that may be segmented by person, object, etc. may be used. For example, the video may be received from the camera on the physical portal device, and the depth (e.g., distance) may be received from a sensor, such as a Lidar sensor. As another example, the augmented reality device may generate depth data from the video without using an additional sensor by using a machine learning technique. An example of such a Depth API, an example of which is described at developers.google.com/ar/develop/java/depth/quickstart, the disclosure of which is hereby incorporated, by reference, in its entirety.

Upon receiving the video and depth data, the remote user computer program may render the user of the physical portal or an object may volumetrically (i.e., according to the depth data) in the virtual environment, thus giving the impression of a three-dimensional user or object in the virtual environment.

If the gesture or command is to "pass" an object from the virtual environment to the physical environment, or to "teleport" the avatar or streaming video of the remote user to the physical environment, the augmented reality application may generate a visualization of the object or user in the physical environment, and may animate the object or user at a location in the physical environment. As the object or user moves, the location of the object or user may be synchronized by the synchronizing computer program.

Figure 3:
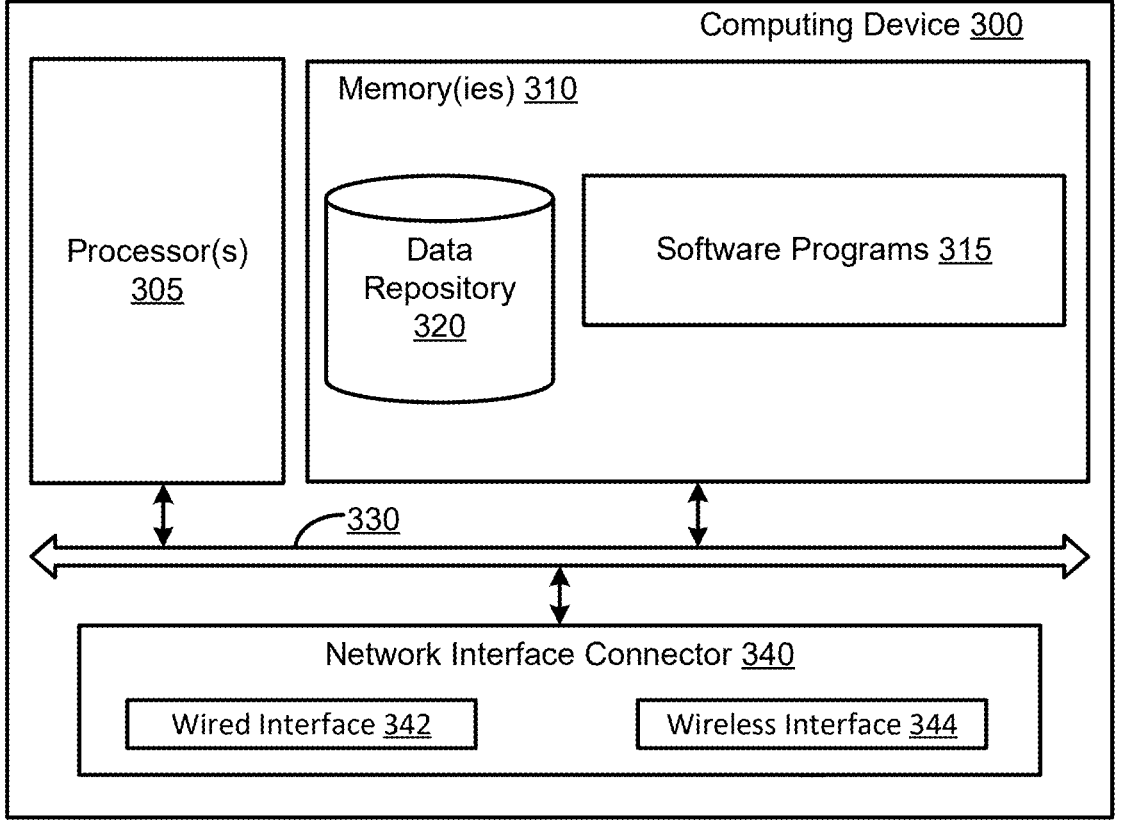
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:
   receiving, by a synchronizing computer program executed by the server, an augmented reality map of a physical environment, the augmented reality map generated from a scan of the physical environment and comprising a coordinate system;
   receiving, by the synchronizing computer program executed by a server, a physical location and a physical orientation of a physical portal device in a physical environment, the physical portal device comprising a monitor and a computer processor executing an augmented reality application;
   aligning, by the synchronizing computer program, the physical location and the physical orientation of the physical portal device with a virtual location and a virtual orientation of a virtual portal rendered in a virtual environment, wherein the virtual portal is a virtual representation of the physical portal device, wherein the aligning uses the coordinate system of the augmented reality map to co-register the physical location and the physical orientation to the virtual location and the virtual orientation;
   receiving, by a remote user computer program executed by a remote user electronic device, the virtual location and virtual orientation of the virtual portal from the synchronizing computer program;
   rendering, by the remote user computer program, the virtual portal in the virtual environment according to the virtual location and virtual orientation, the virtual environment being a representation of the physical environment;
   streaming, by the augmented reality application, augmented reality video of the physical environment from the physical portal device to the remote user computer program; and
   displaying, by the remote user computer program, the augmented reality video in the virtual portal, wherein the augmented reality video comprises video of the physical environment and at least one virtual object generated by the augmented reality application, and the rendering and displaying are synchronized using the coordinate system, wherein the augmented reality video is texture-mapped only within the bounded surface of the virtual portal and comprises video of the physical environment and at least one virtual object generated by the augmented reality application, and the rendering and displaying are synchronized using the coordinate system.

2. The method of claim 1, further comprising:
   capturing, by the remote user computer program, audio and video of a remote user;
   streaming, by the remote user computer program, the audio and video to the augmented reality application; and
   displaying, by the augmented reality application, a virtual representation of the remote user in the virtual environment on the monitor of the physical portal device.

3. The method of claim 2, further comprising:
   receiving, by the synchronizing computer program, a remote user location and a remote user orientation of the remote user; and
   synchronizing, by the synchronizing computer program, the remote user location and the remote user orientation of the remote user with the virtual representation of the remote user in the physical environment.

4. The method of claim 1, further comprising:
   receiving, by the synchronizing computer program, an updated physical location and an updated physical orientation of the physical portal device; and
   updating, by the synchronizing computer program, the physical location and the physical orientation of the virtual portal in the virtual environment based on the updated physical location and the updated physical orientation.

5. The method of claim 1, further comprising:

capturing, by the augmented reality application, a gesture from a user of the physical portal device and initiating an action based on the gesture.

6. The method of claim 5, wherein the action comprises animating passing an object from the physical environment to the virtual environment.

7. The method of claim 5, wherein the action comprises animating the user of the physical portal device in the virtual environment.

8. The method of claim 1, wherein the virtual environment is a representation of the physical environment.

9. The method of claim 1, wherein the augmented reality video comprises video of the physical environment and a virtual object generated by the augmented reality application.

10. A system, comprising:

a physical portal device located in a physical environment, the physical portal device comprising:

a monitor configured to display a virtual environment;

a camera configured to capture video of the physical environment, and an augmented reality application executed by a computer processor;

a remote user electronic device executing a remote user computer program; and a server comprising a computer processor and executing a synchronizing computer program;

wherein:

the synchronizing computer program is configured to receive a physical location and a physical orientation of the physical portal device;

the synchronizing computer program is configured to align the physical location and the physical orientation of the physical portal device with a virtual location and a virtual orientation of a virtual portal rendered in a virtual environment, wherein the virtual portal is a virtual representation of the physical portal device;

the remote user computer program is configured to receive the virtual location and virtual orientation of the virtual portal from the synchronizing computer program;

the remote user computer program is configured to render the virtual portal in the virtual environment according to the virtual location and virtual orientation;

the augmented reality application is configured to stream augmented reality video of the physical environment from the physical portal device to the remote user computer program; and the remote user computer program is configured to display the augmented reality video in the virtual portal, wherein the augmented reality application is further configured to capture a scan of the physical environment and to generate an augmented reality map comprising a coordinate system, the synchronizing computer program is configured to synchronize the physical location and the physical orientation of the physical portal device to the virtual location and the virtual orientation of the virtual portal using the coordinate system, the virtual environment is a representation of the physical environment, and the augmented reality video comprises video of the physical environment and at least one virtual object generated by the augmented reality application, wherein the augmented reality video is texture-mapped only within the bounded surface of the virtual portal and comprises video of the physical environment and at least one virtual object generated by the augmented reality application, and the rendering and displaying are synchronized using the coordinate system.

11. The system of claim 10, further comprising:

the remote user computer program is configured to capture audio and video of a remote user;

the remote user computer program is configured to stream the audio and video to the augmented reality application; and the augmented reality application is configured to display a virtual representation of the remote user in the virtual environment on the monitor of the physical portal device.

12. The system of claim 11, wherein:

the synchronizing computer program is configured to receive a remote user location and a remote user orientation of the remote user; and the synchronizing computer program is configured to synchronize the remote user location and the remote user orientation of the remote user with the virtual representation of the remote user in the physical environment.

13. The system of claim 10, wherein:

the synchronizing computer program is configured to receive an updated physical location and an updated physical orientation of the physical portal device; and the synchronizing computer program is configured to update the physical location and the physical orientation of the virtual portal in the virtual environment based on the updated physical location and the updated physical orientation.

14. The system of claim 10, wherein:

the augmented reality application is configured to capture a gesture from a user of the physical portal device and to initiate an action based on the gesture.

15. The system of claim 14, wherein the action comprises animating passing an object from the physical environment to the virtual environment.

16. The system of claim 14, wherein the action comprises animating the user of the physical portal device in the virtual environment.

17. The system of claim 10, wherein the virtual environment is a representation of the physical environment.

18. The system of claim 10, wherein the augmented reality video comprises video of the physical environment and a virtual object generated by the augmented reality application.

\* \* \* \* \*